(12) United States Patent
Bonicel

(10) Patent No.: US 8,208,779 B2
(45) Date of Patent: Jun. 26, 2012

(54) OPTICAL BOX AND METHOD OF CONNECTING OPTICAL FIBRES

(75) Inventor: Jean-Pierre Bonicel, Rueil Malmaison (FR)

(73) Assignee: Draka Comteq B.V. (NL)

( * ) Notice: Subject to any disclaimer, the term of this patent is extended or adjusted under 35 U.S.C. 154(b) by 534 days.

(21) Appl. No.: 12/420,418

(22) Filed: Apr. 8, 2009

(65) Prior Publication Data

US 2009/0252462 A1    Oct. 8, 2009

(30) Foreign Application Priority Data

Apr. 8, 2008   (FR) ..................................... 08 01927

(51) Int. Cl.
*G02B 6/00*   (2006.01)
(52) U.S. Cl. ........................ 385/135; 385/136
(58) Field of Classification Search .................. 385/135, 385/136
See application file for complete search history.

(56) References Cited

U.S. PATENT DOCUMENTS

| | | | |
|---|---|---|---|
| 4,961,623 A | 10/1990 | Midkiff et al. | |
| 5,115,489 A * | 5/1992 | Norris | 385/135 |
| 5,125,060 A * | 6/1992 | Edmundson | 385/100 |
| 5,440,665 A * | 8/1995 | Ray et al. | 385/135 |
| 6,226,434 B1 | 5/2001 | Koshiyama et al. | |
| 6,229,948 B1 * | 5/2001 | Blee et al. | 385/134 |
| 6,427,045 B1 * | 7/2002 | Matthes et al. | 385/135 |
| 6,856,748 B1 | 2/2005 | Elkins, II et al. | |
| 2005/0070647 A1 * | 3/2005 | Iyoshi et al. | 524/155 |
| 2007/0104447 A1 * | 5/2007 | Allen | 385/135 |
| 2007/0189694 A1 | 8/2007 | Mullaney et al. | |
| 2008/0156526 A1 * | 7/2008 | Ducret | 174/659 |

FOREIGN PATENT DOCUMENTS

| | | | |
|---|---|---|---|
| JP | 2000056142 A * | 2/2000 | |
| JP | 2001116968 A | 4/2001 | |
| WO | 97/42694 A1 | 11/1997 | |
| WO | WO 0140840 A1 * | 6/2001 | |

* cited by examiner

*Primary Examiner* — Charlie Peng
*Assistant Examiner* — Peter Radkowski
(74) *Attorney, Agent, or Firm* — Shumaker, Loop & Kendrick, LLP

(57) ABSTRACT

An optical box includes a first part suitable for fastening to an optical fiber distribution cable and a second part having an opening intended for the passage of at least one optical fiber dropped from the distribution cable and at least one optical component positioned in the second part for connecting the dropped optical fiber to at least one optical fiber of a subscriber cable. The second part of the optical box is fastened detachably to the first part of the optical box. The optical box combines the dropping and splicing of optical fibers in a single optical box.

20 Claims, 3 Drawing Sheets

OPTICAL BOX AND METHOD OF CONNECTING OPTICAL FIBRES

BACKGROUND OF THE INVENTION

The present invention relates to an optical box for connecting optical fibres of a distribution cable to optical fibres of subscriber cables. The present invention also relates to a method of connecting at least one optical fibre of a distribution cable to at least one optical fibre of a subscriber cable.

High-capacity telecommunication cables are used in optical fibre telecommunication systems all the way to the user, known under the English acronym FTTH for "Fiber To The Home" or FTTC for "Fiber To The Curb", and an individual access to each micromodule and/or each fibre is realized for a distribution into a particular building or a particular floor. In this context, by "distribution cable" is meant a telecommunication cable containing a plurality of fibres which are grouped in micromodules supplying an optical signal to a whole building or a group of buildings. The distribution cable can in particular be a vertical cable installed in the service shaft of a building or an external cable installed in urban conduits. The distribution cable can contain several tens of optical fibres. By "subscriber cable" is meant a cable containing one or more optical fibres connected to a subscriber box. A subscriber cable generally contains less than 10 optical fibres. A distribution box can supply a whole building, a whole floor or a particular apartment. The distribution cable is generally installed in a service shaft and the subscriber box is installed in each subscriber's premises, at some distance from the distribution cable. In order to connect the fibres of a subscriber cable to the fibres of the distribution cable, typically, a drop cable is used, from the distribution cable to a splicing box in which the bare fibres of the drop cable and of the subscriber cable are connected.

FIG. 1 diagrammatically illustrates an installation for dropping fibres from a distribution cable and connecting the dropped fibres to a subscriber box according to the prior art. Such an installation has in particular been presented by the company Prysmian® during the FTTH conference of the FTTH Council 2008 held in Paris on 27th and 28 Feb. 2008. Such an installation comprises a tapping box 10 fastened onto a distribution cable 100 supplying a whole building for example. The tapping box 10 makes it possible to cover and protect an opening made in the cable 100 by an operator for dropping at least one optical fibre. Generally, a first opening is made in the cable jacket and at least one fibre is cut through this first opening; then a second opening, termed tapping window, is made in the cable jacket and said cut fibre is drawn out in order to be dropped. The distance between the two openings depends on the applications. The tapping box 10 has a connection with a drop cable 120 which contains the dropped fibre(s) of the distribution cable 100. The installation of FIG. 1 also shows a splicing box 20 in which the drop cable 120 and a subscriber cable 150 emerge. The subscriber cable 150 is moreover connected to a subscriber box 30 in order to supply an optical signal to a particular subscriber. The splicing box 20 can receive a plurality of subscriber cables 150. For example, a whole floor of a building can be supplied by a single drop cable 120 from a vertical distribution cable 100 supplying the whole building; the splicing box 20 then allows a connection between the fibres of each subscriber cable 150 of this floor and the corresponding fibres of the drop cable 120.

The installation of FIG. 1 requires the use of two separate boxes, one for the dropping and the other for the splicing. The use of two separate boxes is often due to the fact that splicing is a delicate operation which requires the operator to work comfortably, while the dropping is generally carried out from a service shaft which is difficult to access. Nevertheless, the use of two boxes represents a cost and increases the number of operations during installation of an optical network in buildings. Furthermore, the increase in the number of boxes can detract from the decorative aesthetics of the building.

A need therefore exists for an optical box which makes it possible to combine the dropping and splicing of optical fibres, which is discreet and compact whilst allowing easy and efficient handling by the installation operator.

SUMMARY OF THE INVENTION

To this end, the invention proposes an optical box comprising two parts. A first part of the optical box according to the invention is fastened to the distribution cable at the level of a tapping window, and a second part of the optical box receives the dropped fibre(s) and comprises at least one optical component for a connection with a subscriber cable. The second part of the optical box is fastened detachably to the first part. Thus an optical box is provided which combines dropping—in the first part of the optical box—and splicing—in the second part of the optical box. The whole is therefore compact and inexpensive. Moreover, as the second part is detachable, the operator can carry out the splicing operation comfortably a little distance from the dropping point and the whole of the optical box can then be positioned in a service shaft or in a discreet location in order not to detract from the interior design aesthetics of the building.

The invention thus relates to an optical box comprising a first part suitable for fastening to an optical fibre distribution cable, a second part having an opening intended for the passage of at least one optical fibre dropped from the distribution cable and comprising at least one optical component for connecting the dropped optical fibre to at least one fibre of a subscriber cable, the second part of the optical box being fastened detachably to the first part of the optical box.

According to one embodiment, the second part is fastened to the first part by clipping.

According to another embodiment, the second part can be equally well fastened according to a first position or a second position onto the first part, the second position corresponding to a rotation of 180° of the second part over the first part with respect to the first position.

According to another embodiment, the first part comprises means of attachment for at least one subscriber cable.

According to another embodiment, the first part comprises a base having an approximately rectangular shape, sides and means of attachment to the distribution cable.

According to another embodiment, the first part also comprises pins locking the cable with respect to traction and to rotation.

According to another embodiment, the base has pre-drilled locations for screws to pass through.

According to another embodiment, the second part comprises two cassettes, a first cassette intended for storing an overlength of said at least one fibre dropped from the distribution cable and a second cassette receiving said at least one optical component.

According to another embodiment, the two cassettes of the second part are hinged to each other by a hinged joint.

According to another embodiment, the optical component arranged in the second part of the optical box is chosen from a mechanical splice, a fusion splice and a splitter.

According to another embodiment, the optical box is formed by injection moulding.

According to another embodiment, the optical box is made of a halogen-free fire-proofed material.

According to another embodiment, the optical box has a thickness ranging between 25 mm and 35 mm, a width ranging between 25 mm and 35 mm and a length ranging between 120 mm and 150 mm.

According to another embodiment, the second part has a ratio of inside useful width to outside width greater than or equal to 0.9.

According to another embodiment, the second part has a length-to-width ratio greater than 3.

The invention also relates to a method of connecting at least one optical fibre of a distribution cable with at least one optical fibre of a subscriber cable, the method comprising making a first opening in the distribution cable and cutting at least one optical fibre, making a second opening in the distribution cable and fastening a first part of an optical box on either side of the second opening, dropping at least one optical fibre of the distribution cable by drawing the at least one cut fibre through the second opening, passing the at least one optical fibre dropped from the distribution cable through an opening of a second part of the optical box, connecting the at least one optical fibre dropped from the distribution cable to at least one optical fibre of the subscriber cable by means of an optical component positioned in the second part of the optical box, and fastening the second part of the optical box onto the first part.

According to one embodiment, the cut fibre is drawn through the second opening of the distribution cable over a distance greater than 0.2 meter, preferably over a distance greater than 1 meter.

According to another embodiment, the method further comprises connecting the at least one optical fibre of the distribution cable and the at least one optical fibre of the subscriber cable in a building having a plurality of floors, in which the first opening of the distribution cable is made at a first floor (n) of the plurality of floors and the second opening of the distribution cable is made at the floor below (n−1) the first floor.

According to another embodiment, the method further comprises connecting the at least one optical fibre of the distribution cable and the at least one optical fibre of the subscriber cable with a distribution cable and at least one subscriber cable comprising optical fibres having, at the wavelength of 1625 nm, bending losses less than 0.1 dB/10 turns for a bending radius of 15 mm and bending losses less than 0.5 dB/turn for a bending radius of 7.5 mm.

BRIEF DESCRIPTION OF THE DRAWINGS

Other characteristics and advantages of the invention will become apparent on reading the description which follows of embodiments of the invention, given by way of example and with reference to the attached figures.

DETAILED DESCRIPTION OF EMBODIMENTS OF THE INVENTION

Figure 1:
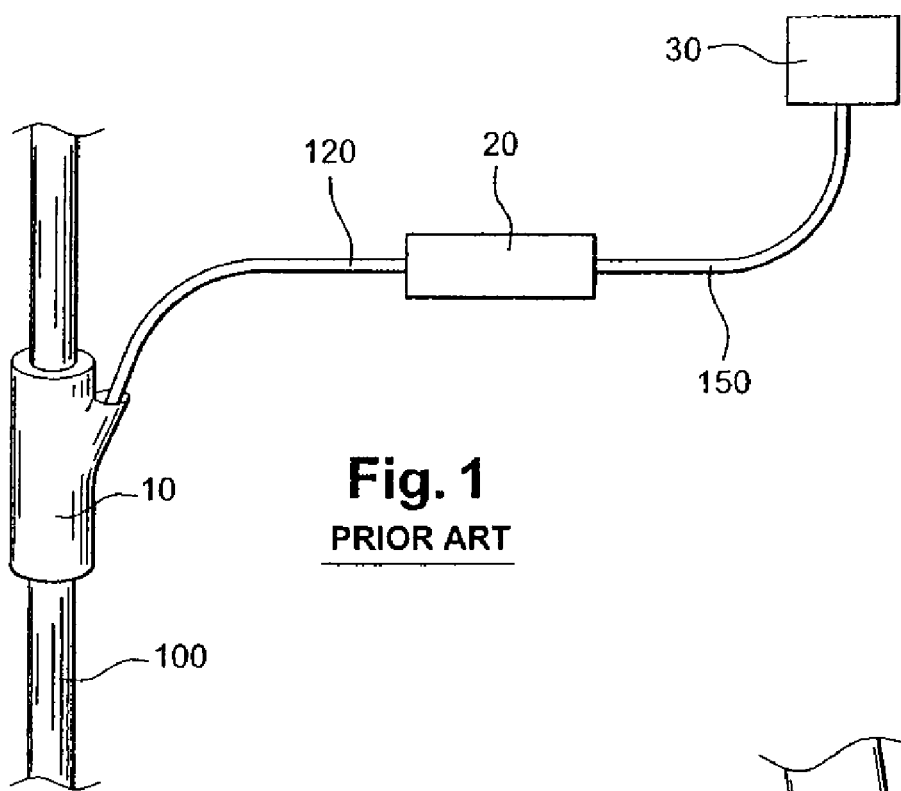
FIG. 1 shows a dropping and connecting installation to a subscriber box according to the prior art.
Figure 2:
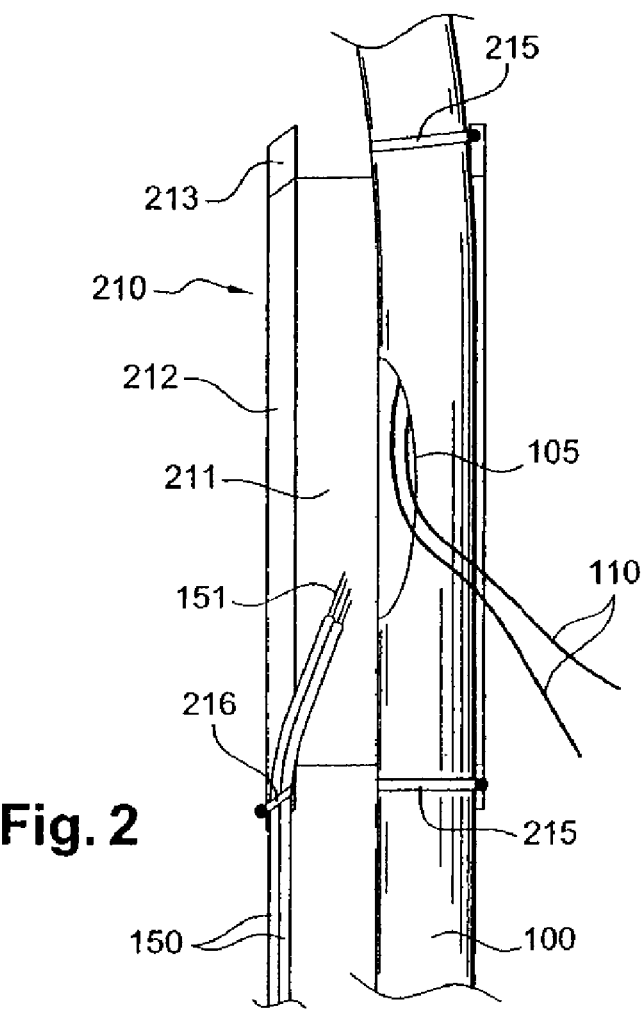
FIG. 2 shows a diagrammatic view of a first part of an optical box according to the invention attached to a distribution cable and a subscriber cable.
Figure 3:
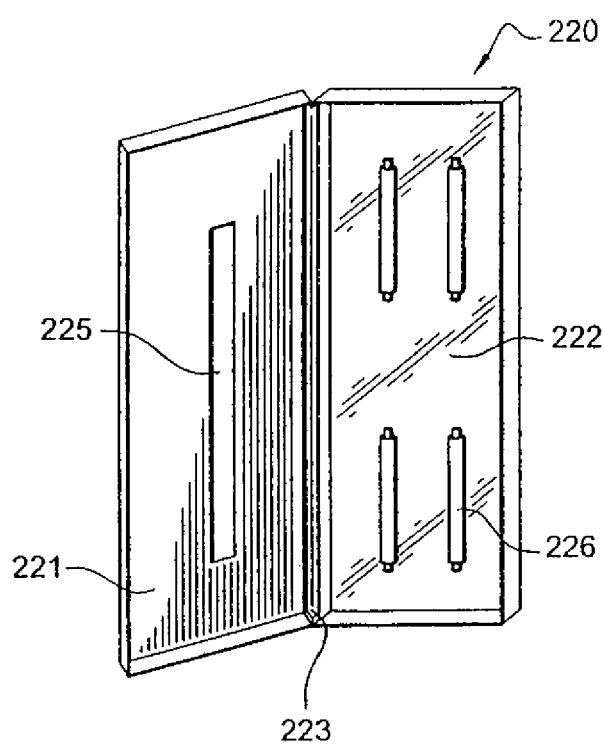
FIG. 3 shows a diagrammatic view of a second part of an optical box according to the invention.
Figure 4:
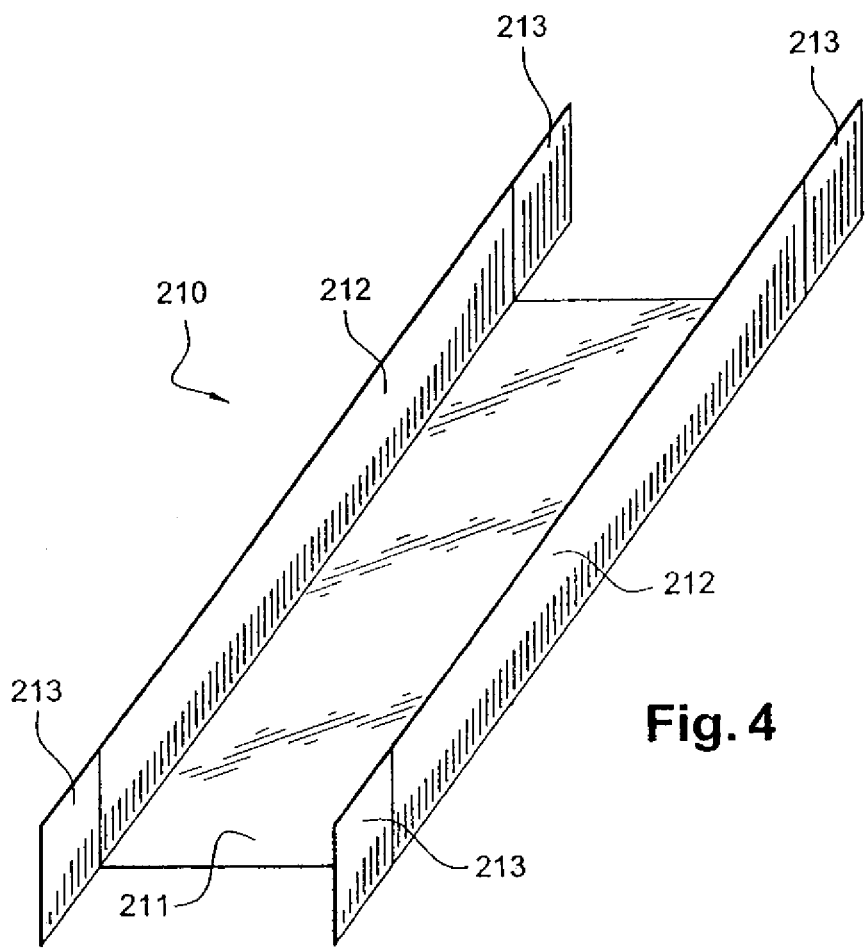
FIG. 4 shows a diagrammatic perspective view of the first part of the optical box.
Figure 7:
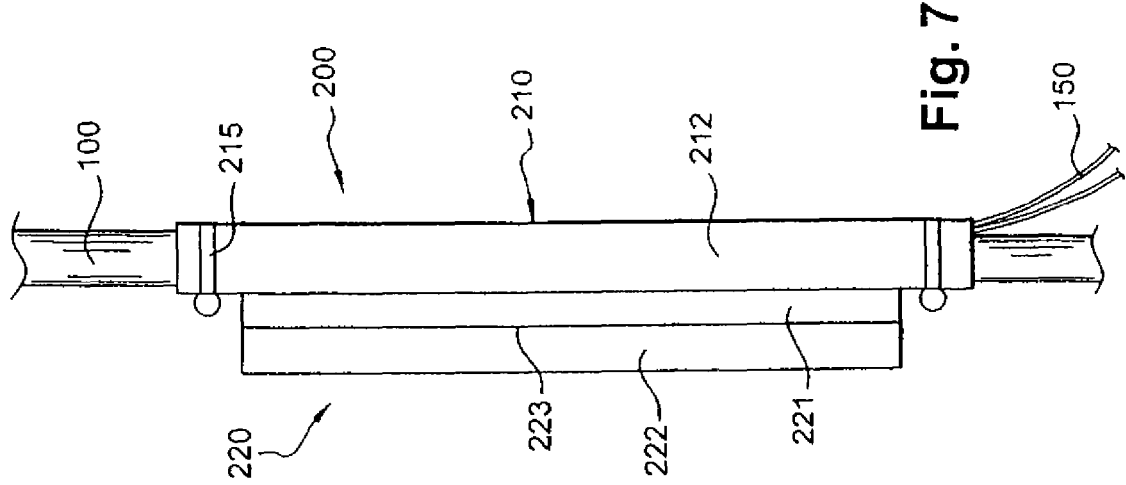
FIG. 7 shows a diagrammatic side view of an optical box according to the invention, attached to a distribution cable and in the closed position.

The invention proposes an optical box combining the functions of a dropping box and a splicing box. To this end, an optical box according to the invention has two parts detachably fastened to each other. FIGS. 2 and 4 show diagrammatically a first part 210 of the optical box according to the invention and FIG. 3 shows diagrammatically a second part 220 of the optical box according to the invention.

FIG. 2 shows a distribution cable 100 which can be a vertical cable installed in a service shaft of a building. In a manner known per se, such a cable comprises a core receiving a plurality of optical fibres and enclosed in a jacket. The fibres can be buffered fibres having a standardized outside diameter of 900 μm or the fibres can be grouped in micromodules. Typically, a micromodule comprises 4 to 12 optical fibres enclosed in a supporting jacket, and a distribution cable 100 can contain 5 to 10 micromodules, even more than 10 micromodules. In a manner known per se, each fibre can have a coloured coating and the jacket of each micromodule 6 can also be coloured in order to facilitate the identification of the fibres in the cable during connection operations.

The cable 100 can moreover comprise reinforcing elements (not illustrated) arranged in the jacket to make the cable 100 more rigid and allow the weight of the cable 100 to be supported once it is installed in vertical position. The jacket of the cable 100 can be made from a material compatible with existing standards for interior uses, in particular vis-à-vis fire standards, and making it possible to produce the jacket by extrusion. The material of the jacket is also chosen to allow easy cutting with scissors or with a cutter and tearing by hand.

In order to connect a subscriber to an optical network, a tapping window 105 is made in the cable jacket 100. Typically, a first opening (not illustrated) is made at a particular floor (n) and one or more fibres or micromodules are cut through this first opening. A second opening (a tapping window) 105 is then made at the floor below (n−1) and the cut fibre(s) 110 are drawn through this opening 105 to be dropped and connected to the fibres 151 of a subscriber cable 150. The first and second openings, of the order of 10 cm long can be made manually using a cutting tool such as scissors or a cutter.

Figure 5:
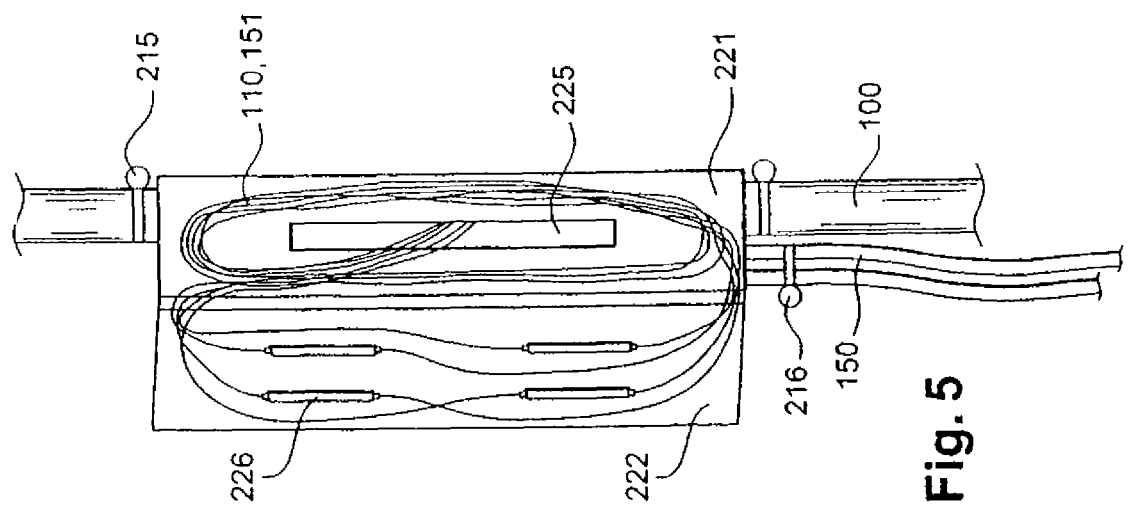
FIG. 5 shows a diagrammatic view of an optical box according to the invention, attached to a distribution cable and in the open position.

FIG. 2 shows the first part 210 of the optical box, this first part 210 being fastened to the jacket of the distribution cable 100. According to the illustrated embodiment, the first part 210 of the optical box comprises a base 211 having an approximately rectangular shape, sides 212, means of attachment 215 for fastening to the distribution cable 100 and means of attachment 216 of at least one subscriber cable 150. The base 211 can be made of plastic; it can be generally rectangular in shape, with a length ranging between 120 mm and 150 mm, i.e. a length adequate to cover the tapping window (or second opening) 105, and a width ranging between 25 mm and 35 mm. The thickness of the base 211 and the edges 212 can be of the order of 2 mm to 5 mm. The sides 212 of the first part 210 are slightly re-entrant, i.e. they have an acute angle with respect to the plane of the base 211. They can be made in a single piece with the base 211, in moulded plastic. Preferably, a plastic having a degree of elasticity will be chosen for forming the base 211 and the edges 212 of the first part 210, such as polyamide, ABS (acrylonitrile butadiene styrene), polypropylene, or any other injectable polymer, with or without glass fibres filler, fire-proofed or not. The angle of the sides 212 with respect to the base 211 and the material used are chosen to allow fastening by clipping the second part 220 onto the first part 210, the sides 212 having the role of spring clip to hold the second part 220 in place as illustrated in FIG. 5. To this end, the sides 212 have a height slightly greater than the diameter of the distribution cable 100, to allow the second part 220 to be clipped onto the first part 210 over the distribution cable 100 which has a diameter typically ranging between 6 mm and 16 mm.

The sides 212 can extend beyond the base 211 to form legs 213 used by the means of attachment 215, 216. As the base 211 and the sides 212 are symmetrical, this first part 210 of the optical box 200 can be equally well fastened on the right or left side of a distribution cable 100 (left fastening in FIG. 2 and right in FIG. 5) and the subscriber cables 150 can be attached equally well to the top or the bottom of the optical box 200 (insertion of the subscriber cables 150 from below in FIG. 2 and from above in FIG. 5). The means of attachment 215 of the first part 210 of the optical box 200 to the distribution cable 100 can be clamp collars or adhesive strips encircling the cable 100 and the legs 213 of the sides 212 on either side of the base 211.

The fixing of the first part 210 of the optical box 200 to the distribution cable 100 can be completed by a fastening of the base 211 to a support, for example a wall or a partition of the service shaft, using pre-drilled locations for passing screws through the base 211 of the optical box 200.

The first part 210 of the optical box 200 can also comprise means of attachment 216 of at least one subscriber cable 150. These means of attachment 216 can also be clamp collars or adhesive strips which encircle the subscriber cables 150 and one of the legs 213 of the sides 212 projecting beyond the base 211. Thus 1 to 4 subscriber cables 150 can be attached onto the optical box 200. The subscriber cables 150 can also be fastened onto the individual legs which are integral with the base 211.

The base 211 can also be equipped with pins on which the distribution cable 100 and the subscriber cables 150 are supported. These pins facilitate the anchorage of the cables 100, 150 on the optical box 200 under the effect of traction or rotation by means of the combined action of the base 211, the pins and the fasteners 215, 216.

The U-shape of the first part 210 of the optical box 200, as illustrated in FIG. 4, allows for the arrangement of the distribution cable 100 as well as the arrangement of the incoming subscriber cables 150 and allows for the second part 220 of the optical box 200 to be received. The assembly is therefore compact.

FIG. 3 shows the second part 220 of the optical box 200. This second part 220 has an opening 225 intended for at least one fibre 110 dropped from the distribution cable 100 to pass through, and for at least one fibre 151 of a subscriber cable 150 to pass through when the latter is attached to the first part 210 of the optical box 200. The subscriber cable 150 can also be inserted directly into the second part 220 of the optical box 200; in this case, the subscriber fibres 151 do not pass through the opening 225. FIG. 3 also shows that the second part 220 of the optical box further comprises at least one optical component 226 for connecting at least one fibre 110 dropped from the distribution cable 100 with at least one fibre 151 of a subscriber cable 150. Depending on the installations, the second part 220 of the optical box 200 can comprise 1 to 4 optical components 226 which can be mechanical splices or fusion splices or optical splitters.

According to the embodiment illustrated in FIG. 3, the second part 220 of the optical box 200 comprises two cassettes 221, 222. A first cassette 221 is intended to store any overlength of fibre once the second part 220 has been fastened to the first part 210 of the optical box 200; and a second cassette 222 receives the optical component(s) 226. The two cassettes 221, 222 can be hinged by a hinged joint 223. Such a hinged joint 223 allows easy access to the second part 220, even when the latter is fastened to the first part 210, whilst guaranteeing the compactness of the assembly and whilst ensuring maximum protection of the stripped optical fibres in the optical box 200.

The second part 220 of the optical box 200 can also be made of plastic. For reasons of cost and simplicity of production, the second part 220 of the optical box 200 can be made of the same material as that used for the first part 210. In particular, the two cassettes 221, 222 can be made by moulding during a single injection operation. The material chosen for making the optical box 200 (first part 210 and second part 220) is preferably a halogen-free fire-proofed material in order to comply with the fire standards for interior use and the European environmental directives. The optical box 200 complies with a protection class which is a minimum of class IP 40 according to standards CEI 34-5-EN 60034-5 (IP) which relates to the protection classes for enclosures of electrical equipment. The optical box 200 can also be coloured and carry any kind of suitable inscription, such as a manufacturer's reference, operator's reference or the like.

FIG. 5 shows a diagrammatic view of an optical box 200 according to the invention, attached to a distribution cable 100 with the second part 220 open. It can then be seen that the optical fibres 110 dropped from the distribution cable 100 and the optical fibres 151 emerging from the subscriber cable 150 have been passed through the opening 225 of the first cassette 221 of the second part 220 and connected to each other by means of the optical components (splices) 226.

The second part 220 of the optical box 200 is fastened to the first part 210, for example with the first cassette 221 clipped onto the base 211 and retained by the sides 212. The second part 220 can be fastened equally well onto the first part 210 according to two positions, i.e. a rotation of 180° of the second part 220 in relation to the first part 210 is possible.

The second part 220 being detachable from the first part 210 of the optical box 200, the operation of connecting the fibres can be carried out at some distance from the distribution cable 100, i.e. at a distance of at least 20 cm and for example at approximately 1 meter or more from the tapping window 105. The operator can thus move away from the service shaft or corner in which the distribution cable 100 is installed and comfortably perform the operation of connecting the fibres.

The connection of at least one optical fibre 110 dropped from a distribution cable 100 to at least one optical fibre 151 of a subscriber cable 150 by using the optical box 200 can be carried out in the following manner.

A first opening (not illustrated) is made in the distribution cable 100 and at least one optical fibre 110 is cut. Then a second opening 105 is made in the distribution cable 100 at the level where it is desired to make the connection with a subscriber cable 150. Then the first part 210 of the optical box 200 is fastened on either side of this second opening 105; also the subscriber cable(s) 150 are fastened to this first part 210. Then the fibre(s) 110 that it is desired to connect, i.e. the cut fibres 110, are drawn through the second opening 105 of the cable 100 over a distance of at least 20 cm and preferably over a distance of approximately 1 m.

The operator can grip the fibres 110, 151 to be connected and manipulate them at some distance from the distribution cable 100 and the first part 210 of the optical box 200. The fibres 110 dropped from the distribution cable 100 as well as the fibres 151 coming from the subscriber cables 150 are thus passed through the opening 225 of the second part 220 of the optical box 200. The operator then carries out the connection between the fibres 110, 151 according to the requirements of the installation and by means of the optical component(s) arranged in the second part 220 of the optical box 200, without being obliged to remain close to the distribution cable 100.

Once the connections have been made, the operator fastens the second part 220 of the optical box 200 onto the first part 210, storing any overlengths of fibres 110, 151 in the first cassette 221 of the second part 220 of the optical box 200. As the optical fibres 110, 151 are thus coiled in the first cassette 221 of the second part 220 of the optical box 200 with a low radius of curvature of the order of 10 mm, it will be preferred to use optical fibres which are particularly resistant to bending losses, both for the distribution cable 100 and for the subscriber cable 150. Optical fibres 110, 151 having the profiles as described in documents EP-A-1 785 754 or EP-A-1 845 399 or optical fibres marketed by the applicant under the marks "BendBright™" or "BendBright$^{xs}$" are particularly suitable within the scope of the present invention. In particular, such fibres have, at a wavelength of 1625 nm, bending losses less than 0.1 dB/10 turns for a bending radius of 15 mm and bending losses less than 0.5 dB/turn for a bending radius of 7.5 mm. These fibres also comply with ITU recommendation G.657B. It is however understood that other fibres can be used with an optical box 200 according to the invention, the fibres mentioned above being given by way of an example of implementation only.

In order to limit the bends in the fibres 110, 151, it is sought to produce an optical box 200 having a maximum useful width and a rectangular shape making it possible to house a substantial overlength of dropped fibres 110 for a minimized bent fibre length. Thus, the second part 220 of the optical box 200 preferably has a ratio of useful interior width to exterior width greater than or equal to 0.9, i.e. that the first cassette 221 of the second part 220 has very thin sides. Moreover, the second part 220 of the optical box 200 preferably has a length-to-width ratio greater than 3.

Figure 6:
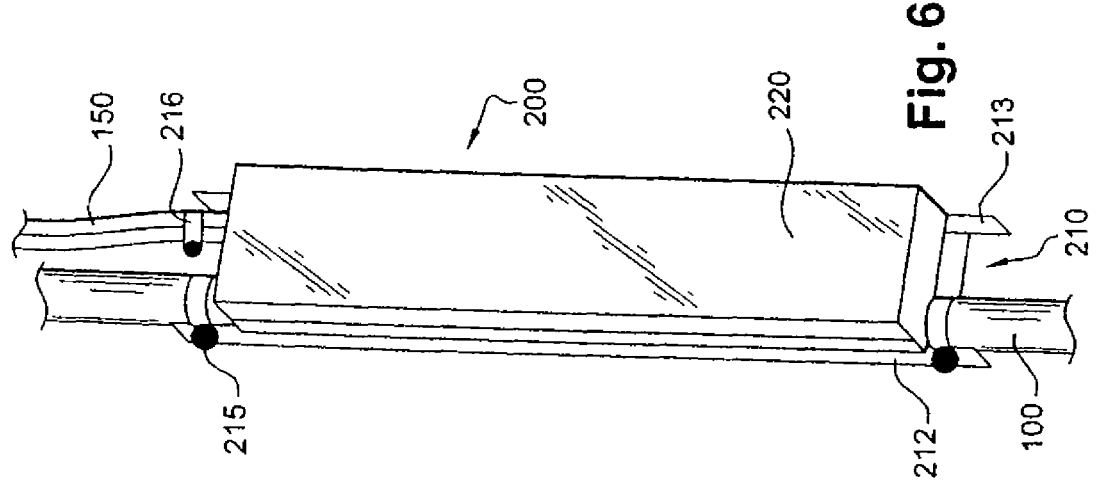
FIG. 6 shows a diagrammatic top view of an optical box according to the invention, attached to a distribution cable and in the closed position.

Once the second part 220 is fastened onto the first part 210, an optical box 200 is obtained which is particularly compact and combines dropping and splicing in a single optical box 200, as illustrated in FIGS. 5 and 6 which shows diagrammatic top and side views. The nominal dimensions of the optical box 200 are quite small, with a total thickness (first part 210 and second part 220 assembled) ranging between 25 and 35 mm, a width ranging between 25 and 35 mm and a length ranging between 120 and 150 mm. The length, width and thickness dimensions of the optical box 200 can be selected independently of each other and dependant on the applications envisaged, in particular the space available for the optical box 200 to be installed in a given location. Thus, an optical box 200 according to the invention is discreet, inexpensive, easy to use and ensures effective protection of the fibres and the splices or splitters. It is perfectly possible to integrate such an optical box 200 into conduits or beads typically used for telecommunication or electricity cables.

The method of connection described above can be implemented in a building having a plurality of floors. The first opening of the distribution cable is then made at a first floor (n) and the second opening 105 of the distribution cable 100 is made at the floor below (n−1). Advantageously, in order to connect floor (n), the first opening, which was used to cut the dropped fibres 110 at the floor below (n−1), can also be used as a second opening 105 with a first opening made at the floor above (n+1). This makes it possible to limit the number of windows to be cut in the distribution cable 100 and the number of weakened points in the cable is thus reduced.

The embodiments described above and the figures must be considered as having been presented as a non-restrictive illustration and the invention is not deemed to be limited to the details provided here but can be modified without exceeding the scope of the attached claims. In particular, other shapes and dimensions can be envisaged for an optical box according to the invention and fastening means other than clipping can be envisaged for fastening the second part of the box detachably to the first part, such as for example an adhesive bond which can be repositioned.

That which is claimed is:

1. An optical box adapted for dropping at least one fibre from a distribution cable having a first opening and a second opening spaced apart from the first opening and for connecting the at least one fibre of the distribution cable to at least one fibre of a subscriber cable, the optical box comprising:
a first part adapted for fastening to the distribution cable about the second opening of the distribution cable, the first part comprising a base having a generally rectangular shape and lateral sides extending from the base, the first part having means for attachment for the subscriber cable; and
a second part housing at least one optical component therein for connecting the at least one fibre of the distribution cable with the at least one fibre of the subscriber cable, the second part adapted to be engaged by the lateral sides of the first part to detachably fasten the second part to the first part, the second part including a single elongate opening through one side thereof facing in the direction of the first part when engaged therewith through which the at least one optical fibre from the distribution cable and the at least one optical fibre from the subscriber cable pass from the first part to within the second part, wherein the at least one optical fibre from the distribution cable and the at least one optical fibre from the subscriber cable are connected within the second part by the at least one optical component.

2. The optical box according to claim 1, in which the lateral sides of the first part function as a spring clip such that the second part is clipped onto the first part over the distribution cable to detachably fasten the second part to the first part.

3. The optical box according to claim 1, in which the second part is adapted to be detachably fastened to the first part in a first position and in a second position corresponding to a rotation of 180° of the second part relative to the first part from the first position.

4. The optical box according to claim 1, in which the first part further comprises means of attachment for at least one of the distribution cable and the subscriber cable.

5. The optical box according to claim 1, in which the second part comprises a first cassette adapted to store an overlength of at least one of the fibre of the distribution cable and the fibre of the subscriber cable, and a second cassette adapted to receive the at least one optical component.

6. The optical box according to claim 5, in which the first cassette has an opening formed through a medial portion for passing the at least one fibre of the distribution cable from the first part to the second part.

7. The optical box according to claim 5, in which the first cassette and the second cassette are hinged together by a hinge joint.

8. The optical box according to claim 1, in which the at least one optical component of the second part is selected from the group consisting of a mechanical splice, a fusion splice and a splitter.

9. The optical box according to claim 1, in which at least one of the first part and the second part is formed by injection moulding.

10. The optical box according to claim 1, in which at least one of the first part and the second part is made of a halogen-free fire-proofed material.

11. The optical box according to claim 1, in which the first part and the second part have a total thickness ranging between 25 mm and 35 mm, a width ranging between 25 mm and 35 mm and a length ranging between 120 mm and 150 mm.

12. The optical box according to claim 1, in which the second part has a ratio of inside useful width to outside width greater than or equal to 0.9.

13. The optical box according to claim 1, in which the second part has a length-to-width ratio greater than 3.

14. The optical box according to claim 1, in which the at least one fibre of the distribution cable is cut at the first opening of the distribution cable and is drawn through the second opening of the distribution cable over a distance of at least 20 cm.

15. The optical box according to claim 13, in which the at least one fibre of the distribution cable is drawn through the second opening of the distribution cable over a distance of at least 1 m.

16. In combination, a distribution cable and an optical box adapted for dropping at least one fibre of the distribution cable and for connecting the at least one fibre of the distribution cable to at least one fibre of a subscriber cable, comprising:
    a distribution cable having a first opening and a second opening spaced apart from the first opening; and
    an optical box adapted for fastening to the distribution cable about the second opening, the optical box comprising:
        a first part comprising a base having a generally rectangular shape and lateral sides extending from the base; and
        a second part comprising a first cassette and a second cassette, the first cassette having an opening formed therethrough facing in the direction of the first part for passing the at least one fibre of the distribution cable from the first part to the second part and adapted to store an overlength of the at least one fibre of the distribution cable, the second cassette comprising at least one optical component for connecting the at least one fibre of the distribution cable with the at least one fibre of the subscriber cable.

17. A method of connecting at least one fibre of a distribution cable with at least one fibre of a subscriber cable comprising:
    making a first opening in the distribution cable and cutting the at least one fibre of the distribution cable at the first opening;
    making a second opening in the distribution cable spaced apart from the first opening and fastening a first part of an optical box to the distribution cable on either side of the second opening;
    dropping the at least one fibre of the distribution cable by drawing the at least one fibre of the distribution cable through the second opening in the distribution cable;
    passing the at least one fibre of the distribution cable from the first part of the optical box to a second part of the optical box through an opening in the second part of the optical box facing in the direction of the first part of the optical box;
    passing the at least one fibre of the subscriber cable from the first part of the optical box to a second part of the optical box through the opening in the second part of the optical box;
    connecting the at least one fibre of the distribution cable with the at least one fibre of the subscriber cable within the second part of the optical box by means of at least one optical component positioned in the second part of the optical box; and
    fastening the second part of the optical box onto the first part of the optical box over the second opening in the distribution cable.

18. The method according to claim 17, in which the at least one fibre of the distribution cable is drawn through the second opening in the distribution cable over a distance of at least 20 cm.

19. The method according to claim 17, in which the at least one fibre of the distribution cable is drawn through the second opening in the distribution cable over a distance of at least 1 m.

20. The method according to claim 17, in which the first opening in the distribution cable is made at a first floor in a building and the second opening in the distribution cable is made at a second floor in the building below the first floor.

* * * * *